(12) United States Patent  
Mitsunobu et al.

(10) Patent No.: US 11,725,259 B2  
(45) Date of Patent: Aug. 15, 2023

(54) PLATED STEEL SHEET

(71) Applicant: NIPPON STEEL CORPORATION, Tokyo (JP)

(72) Inventors: Takuya Mitsunobu, Tokyo (JP); Jun Maki, Tokyo (JP); Hiroshi Takebayashi, Tokyo (JP); Takehiro Takahashi, Tokyo (JP); Kohei Tokuda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 69 days.

(21) Appl. No.: 17/427,544

(22) PCT Filed: Apr. 16, 2020

(86) PCT No.: PCT/JP2020/016756  
§ 371 (c)(1),  
(2) Date: Jul. 30, 2021

(87) PCT Pub. No.: WO2020/213688  
PCT Pub. Date: Oct. 22, 2020

(65) Prior Publication Data  
US 2022/0119921 A1   Apr. 21, 2022

(30) Foreign Application Priority Data  
Apr. 19, 2019   (JP) ................ 2019-080288

(51) Int. Cl.  
*C22C 18/04*   (2006.01)  
*C23C 2/28*   (2006.01)  
(Continued)

(52) U.S. Cl.  
CPC ............ *C22C 18/04* (2013.01); *B32B 15/012* (2013.01); *B32B 15/013* (2013.01); *B32B 15/04* (2013.01);  
(Continued)

(58) Field of Classification Search  
CPC ......... C22C 18/04; C22C 18/00; C22C 21/00; C22C 38/02; C22C 38/04; C22C 38/00;  
(Continued)

(56) References Cited

U.S. PATENT DOCUMENTS

2018/0320260 A1   11/2018   Oh et al.  
2020/0002798 A1*   1/2020   Tokuda .................... C23C 2/06  
(Continued)

FOREIGN PATENT DOCUMENTS

JP   2002-302749 A   10/2002  
JP   2009-120947 A   6/2009  
(Continued)

*Primary Examiner* — Michael E. La Villa  
(74) *Attorney, Agent, or Firm* — Birch, Stewart, Kolasch & Birch, LLP (57) ABSTRACT

A plated steel sheet having excellent chemical convertibility includes: a steel; and a plating layer that is provided on a surface of the steel, in which the plating layer includes, by mass %, Al: 5.00% to 35.00%, Mg: 2.50% to 13.00%, Fe: 5.00% to 35.00%, Si: 0% to 2.00%, Ca: 0.03% to 2.00%, and a remainder consisting of Zn and impurities, and in a surface of the plating layer, the area fraction of a Fe—Al phase is 0% to 30%, the area fraction of a rod-like lamellar structure of Zn and $MgZn_2$ is 5% to 90%, the area fraction of a massive $MgZn_2$ phase is 10% to 70%, and the area fraction of a remainder is 10% or less.

11 Claims, 1 Drawing Sheet

(51) Int. Cl.
| | |
|---|---|
| *C23C 2/06* | (2006.01) |
| *C23C 2/40* | (2006.01) |
| *C22C 38/02* | (2006.01) |
| *C22C 38/04* | (2006.01) |
| *B32B 15/01* | (2006.01) |
| *C23C 2/12* | (2006.01) |
| *C22C 18/00* | (2006.01) |
| *C23C 2/02* | (2006.01) |
| *C23C 2/26* | (2006.01) |
| *C23C 28/02* | (2006.01) |
| *C23C 30/00* | (2006.01) |
| *C22C 21/00* | (2006.01) |
| *B32B 15/04* | (2006.01) |
| *C23C 28/00* | (2006.01) |
| *C21D 9/46* | (2006.01) |
| *B32B 15/18* | (2006.01) |
| *C22C 38/00* | (2006.01) |
| *C22C 38/06* | (2006.01) |

(52) U.S. Cl.
CPC ............ *B32B 15/043* (2013.01); *B32B 15/18* (2013.01); *C21D 9/46* (2013.01); *C22C 18/00* (2013.01); *C22C 21/00* (2013.01); *C22C 38/02* (2013.01); *C22C 38/04* (2013.01); *C23C 2/02* (2013.01); *C23C 2/06* (2013.01); *C23C 2/12* (2013.01); *C23C 2/26* (2013.01); *C23C 2/28* (2013.01); *C23C 2/285* (2013.01); *C23C 2/40* (2013.01); *C23C 28/02* (2013.01); *C23C 28/023* (2013.01); *C23C 28/025* (2013.01); *C23C 28/3225* (2013.01); *C23C 30/00* (2013.01); *C23C 30/005* (2013.01); *C22C 38/00* (2013.01); *C22C 38/06* (2013.01); *Y10T 428/12757* (2015.01); *Y10T 428/12799* (2015.01); *Y10T 428/12958* (2015.01); *Y10T 428/12972* (2015.01)

(58) Field of Classification Search
CPC ..... C22C 38/06; B32B 15/013; B32B 15/012; B32B 15/04; B32B 15/043; B32B 15/18; C23C 2/02; C23C 2/06; C23C 2/12; C23C 2/26; C23C 2/28; C23C 2/40; C23C 2/285; C23C 28/02; C23C 28/023; C23C 28/025; C23C 28/3225; C23C 30/00; C23C 30/005; C21D 9/46; Y10T 428/12799; Y10T 428/12757; Y10T 428/12972; Y10T 428/12958
See application file for complete search history.

(56) References Cited

U.S. PATENT DOCUMENTS

| | | |
|---|---|---|
| 2020/0190654 A1 | 6/2020 | Yamamoto et al. |
| 2021/0039354 A1 | 2/2021 | Tokuda et al. |

FOREIGN PATENT DOCUMENTS

| | | | | |
|---|---|---|---|---|
| JP | 2010-70810 | A | 4/2010 | |
| JP | 4579715 | B2 | 11/2010 | |
| JP | 2015-214747 | A | 12/2015 | |
| JP | 2018-115365 | A | 7/2018 | |
| JP | 2018-532889 | A | 11/2018 | |
| WO | WO 2013/011824 | A1 | 1/2013 | |
| WO | WO 2018/139620 | A1 | 8/2018 | |
| WO | WO-2018139620 | A1 * | 8/2018 | ............ C22C 18/04 |
| WO | WO 2019/180852 | A1 | 9/2019 | |

* cited by examiner

PLATED STEEL SHEET

TECHNICAL FIELD OF THE INVENTION

The present invention relates to a plated steel sheet.

Priority is claimed on Japanese Patent Application No. 2019-080288, filed on Apr. 19, 2019, the content of which is incorporated herein by reference.

RELATED ART

Recently, in the building material field or the like, the development of a hot-dip Zn—Al—Mg-based plated steel sheet has progressed.

Patent Document 1 discloses a hot-dip Al—Zn alloy plated steel sheet including a plating layer, in which the plating layer includes, by mass %, Al: 25% to 90% and Sn: 0.01% to 10% and further includes 0.01% to 10% of one kind or more selected from the group consisting of Mg, Ca, and Sr.

Patent Document 2 discloses a chemical conversion steel sheet, in which a hot-dip Zn—Al—Mg alloy plated steel sheet where a proportion of [Al/Zn/Zn$_2$Mg ternary eutectic structure] in an outermost surface of a plating layer is 60 area % or more is a substrate, the plating layer surface is covered with a precipitate layer including at least one kind selected from the group consisting of Ni, Co, Fe, and Mn and where the total adhesion amount of Ni, Co, and Fe is in a range of 0.05 mg/m$^2$ to 5.0 mg/m$^2$ and the adhesion amount of Mn is in a range of 0.05 mg/m$^2$ to 30 mg/m$^2$, a phosphate film formed of a phosphate crystal having an average grain size of 0.5 μm to 5.0 μm, and a chemical conversion film where a valve metal oxide or hydroxide and a valve metal fluoride are present together, the phosphate crystal rises from the plating layer by a base portion being buried in the plating layer, and the chemical conversion film is an organic resin film formed on an interface reaction layer at an interface with the plating layer or the precipitate layer exposed between the phosphate crystal grains.

Patent Document 3 discloses a zinc-based alloy-plated steel including a zinc-based alloy plating layer that is formed on a surface of a steel, in which the zinc-based alloy plating layer includes, by mass %, Mg: 1% to 10%, Al: 2% to 19%, Si: 0.01% to 2%, Fe: 2% to 75%, and a remainder consisting of Zn and unavoidable impurities.

In addition, Patent Document 4 discloses a technique of adding Mg to an Al—Zn-based plating layer in order to provide zinc-based alloy-plated steel having excellent corrosion resistance and weldability.

However, when the techniques disclosed in Patent Documents 1 to 4 are applied to vehicles, an Al oxide is formed on a plating layer surface due to Al in the plating layer. As a result, chemical convertibility deteriorates. In particular, in Patent Document 4, a large amount of a Fe—Zn phase that deteriorates chemical convertibility is formed in the plating layer.

Under these circumstances, it is desired to develop a plated steel sheet having excellent chemical convertibility that is suitable for a vehicle.

PRIOR ART DOCUMENT

Patent Document

[Patent Document 1] Japanese Unexamined Patent Application, First Publication No. 2015-214747
[Patent Document 2] Japanese Patent No. 4579715
[Patent Document 3] Japanese Unexamined Patent Application, First Publication No. 2009-120947
[Patent Document 4] Japanese Unexamined Patent Application, First Publication No. 2009-120947

DISCLOSURE OF THE INVENTION

Problems to be Solved by the Invention

The present invention has been made in consideration of the above-described circumstances, and an object thereof is to provide a plated steel sheet having excellent chemical convertibility.

Means for Solving the Problem

In order to achieve the object, the present invention adopts the following configurations.

That is, according to one aspect of the present invention, there is provided a plated steel sheet including: a steel; and a plating layer that is provided on a surface of the steel, in which the plating layer includes, by mass %, Al: 5.00% to 35.00%, Mg: 2.50% to 13.00%, Fe: 5.00% to 35.00%, Si: 0% to 2.00%, Ca: 0.03% to 2.00%, and a remainder consisting of Zn and impurities, and in a surface of the plating layer, the area fraction of a Fe—Al phase is 0% to 30%, the area fraction of a rod-like lamellar structure of Zn and MgZn$_2$ is 5% to 90%, the area fraction of a massive MgZn$_2$ phase is 10% to 70%, and the area fraction of a remainder is 10% or less.

Here, the plating layer may include, by mass %, Al: 10.00% to 30.00%.

Here, the plating layer may include, by mass %, Mg: 3.00% to 10.00%.

Here, the plating layer may include, by mass %, Mg: 4.00% or more.

In addition, the plating layer may include, by mass %, Ca: 0.03% to 1.00%.

In addition, in the surface of the plating layer, the area fraction of the lamellar structure may be 10% to 60%.

In addition, in the surface of the plating layer, the area fraction of an Al—Zn dendrite mainly formed of an Al phase and a Zn phase may be 5% or less.

In addition, in the surface of the plating layer, the area fraction of a Zn/Al/MgZn$_2$ ternary eutectic structure may be 5% or less.

In addition, in the surface of the plating layer, the area fraction of a massive Zn phase may be 10% or less.

In addition, in the surface of the plating layer, the area fraction of a plate-like Zn/MgZn$_2$ lamellar structure may be 10% or less.

In addition, in the surface of the plating layer, the area fraction of a Mg$_2$Si phase may be 10% or less.

Effects of the Invention

According to the aspect of the present invention, a plated steel sheet having excellent chemical convertibility can be provided.

EMBODIMENTS OF THE INVENTION

Hereinafter, a plated steel sheet according to an embodiment having excellent chemical convertibility and a method of manufacturing the same will be described. In the embodiment, a numerical range represented using "to" refers to a range including numerical values before and after "to" as a lower limit and an upper limit

[Plated Steel Sheet]

The plated steel sheet according to the embodiment includes: a steel; and a plating layer that is provided on a surface of the steel, in which the plating layer includes, by mass %, Al: 5.00% to 35.00%,
Mg: 2.50% to 13.00%,
Fe: 5.00% to 35.00%,
Si: 0% to 2.00%,
Ca: 0% to 2.00%, and
a remainder consisting of Zn and impurities, and in a surface of the plating layer, the area fraction of a Fe—Al phase is 0% to 30%, the area fraction of a rod-like lamellar structure of Zn and $MgZn_2$ is 5% to 90%, the area fraction of a massive $MgZn_2$ phase is 10% to 70%, and the area fraction of a remainder is 10% or less. That is, in the embodiment, by actively forming the rod-like lamellar structure of Zn and $MgZn_2$ having excellent chemical convertibility, the massive $MgZn_2$ phase, and preferably the Fe—Al phase in the plating layer and suppressing the formation of a phase that deteriorates chemical convertibility, for example, an Al—Zn dendrite or a Fe—Zn phase, the chemical convertibility of the plated steel sheet is improved. Further, the plated steel sheet according to the embodiment includes a large amount of the rod-like lamellar structure of Zn and $MgZn_2$. Therefore, liquid metal embrittlement (LME) during spot welding can also be suitably prevented (excellent LME resistance can be obtained).

<Steel>

The material of the steel (base steel sheet) as a base material of the plated steel sheet is not particularly limited. General steel, Ni-precoated steel, Al-killed steel, or some high alloy steel can be used. The shape of the steel is also not particularly limited.

<Plating Layer>

The plated steel sheet according to the embodiment having excellent chemical convertibility includes a plating layer that is formed on a surface of the steel.

(Chemical Composition)

Next, a chemical composition of the plating layer will be described. In the following description, unless specified otherwise, "%" represents "mass %".

Al: 5.0% to 35.00%

Al is an element that is necessary to contain an element other than Zn in the plating layer. Originally, in a Zn plating layer (Zn layer), another element is not likely to be contained, for example, a high concentration of Mg cannot be added. However, by containing Al in the plating layer (Zn-based plating layer), a plating layer containing Mg can be manufactured. Further, Fe dispersed in the plating layer in the alloying process reacts (is alloyed) with Al prior to Zn such that the Fe—Al phase (for example, $Fe_2Al_5$ phase) having excellent post-coating corrosion resistance and LME resistance can be formed. Further, the formation of a Fe—Zn phase that deteriorates post-coating corrosion resistance in the alloying process can be suppressed. It is not necessary that the Fe—Al phase is formed in the plating layer. However, when the Fe—Al phase is formed in the plating layer, post-coating corrosion resistance and LME resistance can be further improved. In addition, in order to suppress the formation of the Fe—Zn phase, Mg addition is also effective, and this effect is exhibited particularly when the Mg concentration is 2.50% or more. The Mg concentration is more preferably 4.00% or more.

When the Al concentration is less than 5.00%, inclusion of Mg and an alloying element imparting performance to the plating layer tends to be difficult. In addition, Al has a low density, and thus a larger amount of an Al phase in terms of mass content is formed as compared to Zn. However, when the Al concentration is less than 5.00%, most of the plating layer tends to be a Zn phase. As a result, chemical convertibility also deteriorates significantly. It is not preferable that the Zn phase is the first phase in the plating layer from the viewpoint of chemical convertibility.

In addition, when the Al concentration is less than 5.0%, in a case where Mg is added, a large amount of dross is formed on the plating bath, and the plated steel sheet cannot be manufactured. Accordingly, the Al concentration is 5.0% or more, preferably 5.00% or more and more preferably 10.00% or more.

On the other hand, when the Al concentration increases excessively, the proportion of the Al phase in the plating layer increases rapidly, the proportion of the rod-like $Zn/MgZn_2$ lamellar structure necessary to impart chemical convertibility decreases, and the proportion of the Fe—Al phase increases excessively, which is not preferable. Therefore, the Al concentration is 35.00% or less and preferably 30.00% or less.

This way, in the embodiment, by balancing the Al concentration and a Fe concentration described below (adjusting the concentrations to be in predetermined concentration ranges), Al reacts actively with Fe to form the Fe—Al phase. Accordingly, in the embodiment, by causing Al to be mainly present as the Fe—Al phase in the plating layer, the amount of Al present as the Al phase can be reduced. As a result, the amount of a dendrite mainly formed of an Al phase and a Zn phase that causes deterioration in corrosion resistance can be reduced.

Mg: 2.50% to 13.00%

Mg is an element that is necessary to impart chemical convertibility. When Mg is added to a Zn-based plating layer, Mg forms $MgZn_2$ as an intermetallic compound. Further, Mg also has a characteristic in that the formation of the Fe—Zn phase is suppressed. The Mg concentration that is the minimum necessary to sufficiently improve the chemical convertibility of the plating layer and to suppress the formation of the Fe—Zn phase is 2.50%. Therefore, the Mg concentration is 2.50% or more, preferably 3.00% or more, and more preferably 4.00% or more.

On the other hand, when the Mg concentration is more than 13.00%, the amount of the $MgZn_2$ phase rapidly increases, the plastic deformability of the plating layer is lost, and the workability deteriorates, which is not preferable. Accordingly, the Mg concentration is 13.00% or less, preferably 11.00% or less, and more preferably 10.00% or less.

This way, in the embodiment, by adding predetermined amounts of Al and Mg to the plating layer, the formation of the Fe—Zn phase is suppressed. Therefore, in the embodiment, the Fe—Zn phase is not substantially present in the plating layer. In particular, the Fe—Zn phase deteriorates the post-coating corrosion resistance and, when the coating surface is damaged, is likely to cause red rust to occur. Therefore, it is preferable that the formation of the Fe—Zn phase is suppressed as much as possible. Examples of the type of the Fe—Zn phase include γ phase, δ phase, and ζ phase. In order to suppress the formation of the Fe—Zn phase, it is necessary that the chemical composition of the plating layer is adjusted to the composition according to the embodiment (in particular, the Al concentration and the Mg concentration are important) and the alloying temperature is 440° C. to 480° C.

Fe: 5.00% to 35.00%

When the Fe concentration is less than 5.00%, the Fe content is insufficient, and the amount of the Fe—Al phase is small, which is not preferable. In addition, when the Fe concentration is less than 5.00%, the area ratio of the Al—Zn dendrite not contributing to the improvement of the chemical convertibility may be more than 5%, which is not preferable. Therefore, the Fe concentration is 5.00% or more, preferably 10.00% or more, and more preferably 15.00% or more.

When the Fe concentration is more than 35.00%, a desired metallographic structure may not be formed in the plating layer according to the embodiment. As the amount of the Fe component increases, the potential increases, appropriate sacrificial protection ability for the steel cannot be maintained, and the corrosion rate may increase, which is not preferable. Therefore, the Fe concentration is 35.00% or less, preferably 30.00% or less, and more preferably 25.00% or less.

In addition, regarding the Fe concentration relative to the Al concentration, Fe/Al is preferably 0.9 to 1.2. By adjusting Fe/Al to be in the above-described range, the $Fe_2Al_5$ phase is likely to be formed.

When Fe/Al is less than 0.9, it is difficult to form a sufficient amount of the $Fe_2Al_5$ phase, and thus an excess amount of the dendrite formed of the Al phase and the Zn phase is formed.

In addition, when Fe/Al is more than 1.2, a Fe—Zn-based intermetallic compound phase is likely to be formed. Even in this case, the $Fe_2Al_5$ phase is not likely to be formed.

Si: 0% to 2.00%

Si is an element that is effective for improving adhesion between the steel and the plating layer. Therefore, Si may be contained in the plating layer. Si is not necessarily contained in the plating layer. Therefore, the lower limit of the Si concentration is 0%. The adhesion improvement effect by Si is exhibited when the Si concentration in the plating layer is 0.03% or more. Therefore, when Si is contained in the plating layer, the Si concentration is preferably 0.03% or more.

On the other hand, even when the Si concentration in the plating layer is more than 2.00%, the adhesion improvement effect by Si is saturated. Therefore, even when Si is contained in the plating layer, the Si concentration is set to be 2.00% or less. The Si concentration is preferably 1.00% or less.

Ca: 0.03% to 2.00%

Ca is an element that is effective for improving the chemical convertibility of the plated steel sheet. Therefore, Ca may be contained in the plating layer. The chemical convertibility improvement effect by Ca is exhibited when the Ca concentration in the plating layer is 0.03% or more. Accordingly, the Ca concentration is 0.03% or more and preferably 0.05% or more.

On the other hand, even when the Ca concentration in the plating layer is more than 2.00%, the chemical convertibility improvement effect by Ca is saturated. Therefore, even when Ca is contained in the plating layer, the Ca concentration is set to be 2.00% or less. The Ca concentration is preferably 1.00% or less.

Remainder: Zn and Impurities

The remainder other than Al, Mg, Fe, Si, and Ca consists of Zn and impurities. Here, the impurities refer to elements that are unavoidably incorporated in the process of plating, and the total amount of the impurities may be about 3.00%. That is, the amount of the impurities in the plating layer may be 3.00% or less.

Examples of elements that may be contained as the impurities and the concentrations of the elements include Sb: 0% to 0.50%, Pb: 0% to 0.50%, Cu: 0% to 1.00%, Sn: 0% to 1.00%, Ti: 0% to 1.00%, Sr: 0% to 0.50%, Ni: 0% to 1.00%, and Mn: 0% to 1.00%. When the impurity elements having concentrations higher than the above-described ranges are contained in the plating layer, it is difficult to obtain the desired characteristics, which is not preferable.

The chemical composition of the plating layer can be measured, for example, using the following method. First, an acid solution is obtained by peeling and dissolving the plating layer with an acid containing an inhibitor that suppresses the corrosion of the base metal (steel). Next, by measuring the obtained acid solution by ICP analysis, the chemical composition (the kinds and contents of the chemical components) of the plating layer can be obtained. The kind of the acid is not particularly limited as long as it is an acid that can dissolve the plating layer. In this measurement method, the chemical composition is measured as the average chemical composition of the entire plating layer as a target to be measured. In Examples described below, the chemical components (chemical composition) of the plating layer were measured using this method.

(Structure)

In a surface of the plating layer according to the embodiment, the area fraction of a Fe—Al phase is 0% to 30%, the area fraction of a rod-like lamellar structure of Zn and $MgZn_2$ ($Zn/MgZn_2$ lamellar structure) is 5% to 90%, the area fraction of a massive $MgZn_2$ phase is 10% to 70%, and the area fraction of a remainder is 10% or less.

Figure 1:
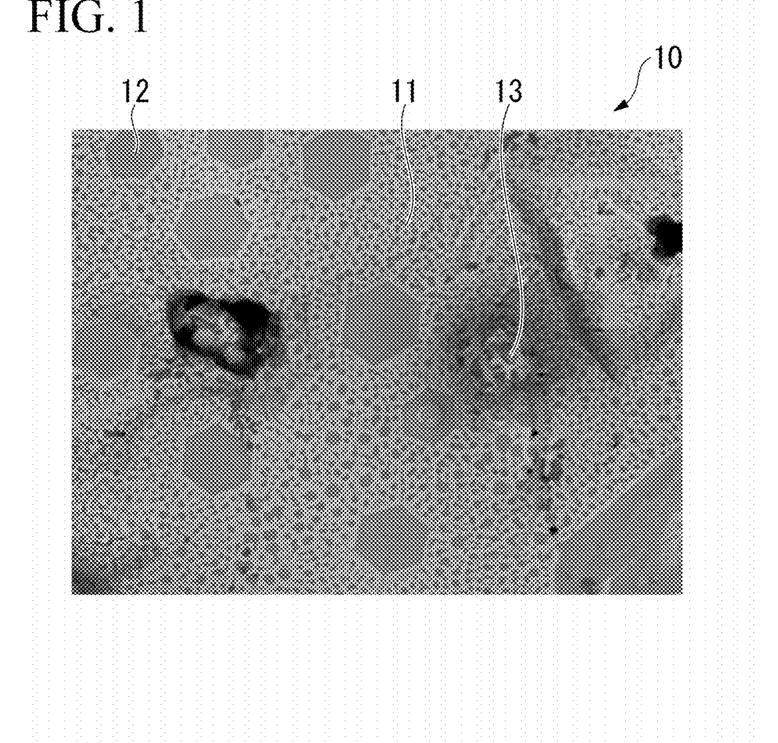
FIG. 1 is a SEM image showing a surface structure of a plating layer according to an embodiment.

FIG. 1 is a SEM image showing a surface structure of a plating layer 10 according to the embodiment. As shown in FIG. 1, when a surface of the plating layer 10 according to the embodiment is observed with a SEM, a rod-like lamellar structure 11 of Zn and $MgZn_2$, a hexagonal massive $MgZn_2$ phase 12, and a Fe—Al phase 13 are observed.

Figure 2:
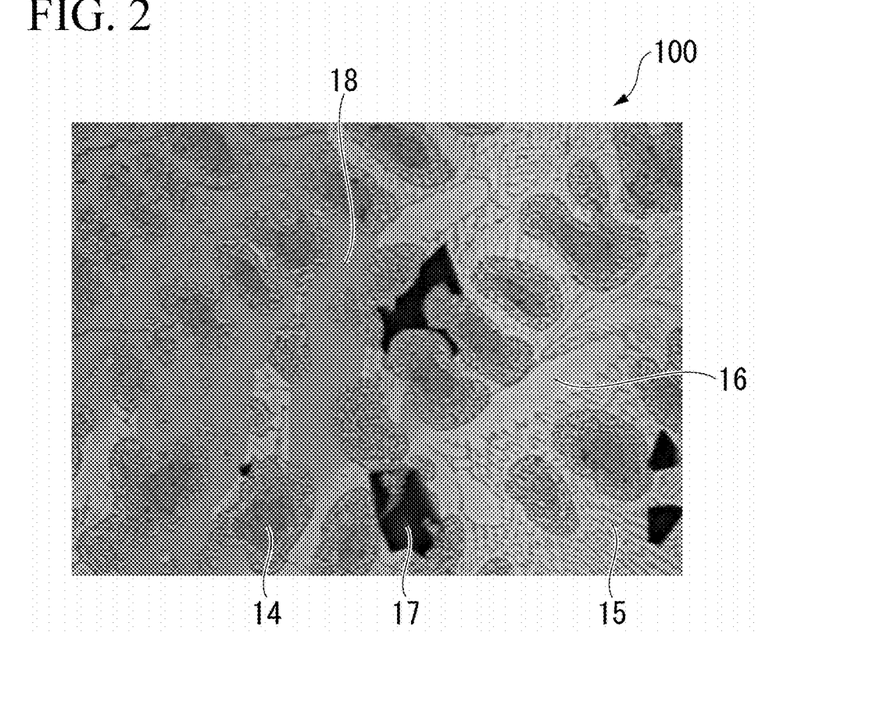
FIG. 2 is a SEM image showing a surface structure of a plating layer in the related art.

FIG. 2 is a SEM image showing a surface structure of a plating layer 100 in the related art. The plating layer 100 according to the related art shown in FIG. 2 is formed by performing hot-dip Zn—Al—Mg-based plating in the related art on steel.

As shown in FIG. 2, the alloying process is not performed on the plating layer 100 in the related art. Therefore, an Al—Zn dendrite 14 or a $Zn/Al/MgZn_2$ ternary eutectic structure 15 accounts for most of the plating layer 100, and a massive Zn phase 16 or a $Mg_2Si$ phase 17 is also observed. A massive $MgZn_2$ phase 18 is not hexagonal, and the rod-like lamellar structure of Zn and $MgZn_2$, the hexagonal massive $MgZn_2$ phase, and the Fe—Al phase are not observed.

Hereinafter, the structure of the plating layer according to the embodiment will be described.

Area Fraction of Fe—Al Phase: 0% to 30%

In the plated steel sheet according to the embodiment, it is preferable that, by performing an alloying process after a hot-dip plating process described below, the Fe—Al phase is formed in the plating layer. The Fe—Al phase according to the embodiment is a phase containing an intermetallic compound of Fe and Al, and examples of the intermetallic compound include $Fe_2Al_5$ and FeAl.

From the viewpoint of excellent chemical convertibility, it is preferable that the Fe—Al phase is not exposed to the surface structure of the plating layer according to the embodiment. The area fraction of the Fe—Al phase that does not deteriorate chemical convertibility is 30%. Therefore, the upper limit of the Fe—Al phase is 30% and preferably less than 20%.

The Fe—Al phase is an important structure from the viewpoint of obtaining chemical convertibility and suitably preventing liquid metal embrittlement (LME) during spot welding (obtaining excellent LME resistance).

Area Fraction of Rod-like Zn/MgZn$_2$ Lamellar Structure: 5% to 90%

The rod-like Zn/MgZn$_2$ lamellar structure is a rod-like lamellar structure of a Zn phase and a MgZn$_2$ phase that is an intermetallic compound. Here, the rod shape represents a microstructural morphology in which the three-dimensional shape of the MgZn$_2$ phase in the Zn/MgZn$_2$ lamellar structure is a rod shape and the vicinity of the rod-like MgZn$_2$ phase is surrounded by the Zn phase. The rod-like Zn/MgZn$_2$ lamellar structure is an important structure from the viewpoint that the plating layer according to the embodiment exhibits suitable chemical convertibility. As described above, the plating layer according to the embodiment contains Ca, and by rapid cooling the base steel sheet at an average cooling rate of 20° C./sec or faster after the alloying process described below, the rod-like Zn/MgZn$_2$ lamellar structure is formed.

When the area fraction of the rod-like Zn/MgZn$_2$ lamellar structure is 5% or more, suitable chemical convertibility can be obtained. Therefore, the area fraction of the rod-like Zn/MgZn$_2$ lamellar structure is 5% or more and preferably 10% or more.

On the other hand, when the area fraction of the rod-like Zn/MgZn$_2$ lamellar structure is more than 90%, the chemical convertibility improvement effect is saturated, the plating layer surface becomes uneven due to eutectic solidification, and the external appearance of the plated steel sheet deteriorates, which is not preferable. Therefore, the area fraction of the rod-like Zn/MgZn$_2$ lamellar structure is 90% or less, preferably 70% or less, and more preferably 60% or less.

The rod-like Zn/MgZn$_2$ lamellar structure is an important structure from the viewpoint that the plated steel sheet can obtain not only chemical convertibility but also desired LME resistance. The details of the mechanism is unclear, but the reason why the rod-like Zn/MgZn$_2$ lamellar structure exhibits excellent LME resistance is presumed to be that Ca is effectively contained in the structure.

Area Fraction of Massive MgZn$_2$ Phase: 10% to 70%

In order to obtain suitable chemical convertibility, the area fraction of the massive MgZn$_2$ phase having a hexagonal shape is preferably 10% or more and more preferably 70% or more.

On the other hand, when the area fraction of the massive MgZn$_2$ phase having a hexagonal shape is more than 70%, the area fraction of the Fe—Al phase or the rod-like Zn/MgZn$_2$ lamellar structure decreases excessively, and it is difficult to obtain suitable chemical convertibility. Therefore, the area fraction of the massive MgZn$_2$ phase is 70% or less.

Area Fraction of Remainder: 10% or Less

In order to obtain suitable chemical convertibility, the total area fraction of structures in the remainder other than the Fe—Al phase, the rod-like Zn/MgZn$_2$ lamellar structure, and the massive MgZn$_2$ phase is 10% or less, preferably 7.5% or less, and more preferably 5% or less.

Examples of the structures in the remainder include a plate-like Zn/MgZn$_2$ lamellar structure described below, an Al—Zn dendrite, a Zn/Al/MgZn$_2$ ternary eutectic structure, a massive Zn phase, and a Mg$_2$Si phase described below. Each of these structures in the remainder will be described below.

Plate-Like Zn/MgZn$_2$ Lamellar Structure: 10% or Less

The plate-like Zn/MgZn$_2$ lamellar structure is a plate-like lamellar structure of a Zn phase and a MgZn$_2$ phase that is an intermetallic compound. As described above, the rod-like Zn/MgZn$_2$ lamellar structure is a structure necessary to obtain chemical convertibility, but the plate-like Zn/MgZn$_2$ lamellar structure does not contribute to chemical convertibility. Therefore, from the viewpoint of obtaining suitable chemical convertibility, the area fraction of the plate-like Zn/MgZn$_2$ lamellar structure is 10% or less and preferably 5% or less.

The rod-like Zn/MgZn$_2$ lamellar structure and the plate-like Zn/MgZn$_2$ lamellar structure are distinguished from each other in the difference in the microstructural morphology and in whether the MgZn$_2$ phase is rod-like or plate-like. Here, as described above, the rod shape represents a microstructural morphology in which the three-dimensional shape of the MgZn$_2$ phase in the Zn/MgZn$_2$ lamellar structure is a rod shape and the vicinity of the rod-like MgZn$_2$ phase is surrounded by the Zn phase. The plate shape represents that the three-dimensional shape of the MgZn$_2$ phase in the Zn/MgZn$_2$ lamellar structure is a plate shape. That is, in the plate-like Zn/MgZn$_2$ lamellar structure, a structure where the plate-like Zn phase and the plate-like MgZn$_2$ phase are alternately laminated is formed.

The three-dimensional shape of the MgZn$_2$ phase can be inspected by cutting the metallographic structure in a depth direction by mechanical polishing or FIB cutting and observing the metallographic structure.

Area Fraction of Dendrite (Al—Zn Dendrite) Mainly Formed of Al Phase and Zn Phase: 5% or Less When the plating layer is formed, in the process of cooling the steel sheet from a bath temperature after the hot-dip plating process described below, first, an Al primary phase (α-(Zn, Al) phase crystallized as the primary phase) is crystallized and grows dendritically (hereinafter, also referred to as "Al—Zn dendrite"). Next, by heating the steel sheet in a temperature range of 440° C. to 480° C. to perform the alloying process, most of the Al—Zn dendrite is substantially replaced with another structure, but a part of the Al—Zn dendrite remains even after the alloying process.

The Al—Zn dendrite does not preferably affect chemical convertibility or LME resistance. Therefore, the area fraction of the Al—Zn dendrite is as low as possible. Therefore, in the plating layer according to the embodiment, the area fraction of the Al—Zn dendrite is 5% or less and more preferably 3% or less.

"Mainly" represents that about 15% or more of the Al phase and the Zn phase are contained in the dendrite by area fraction, and 5% or less of Fe, 3% or less of Mg, and 1% or less of steel component elements (Ni, Mn) may be contained as the remainder other than the Al phase and the Zn phase.

Area Fraction of Zn/Al/MgZn$_2$ Ternary Eutectic Structure: 5% or Less

The Zn/Al/MgZn$_2$ ternary eutectic structure is a layered structure including a Zn layer, an Al layer, and a MgZn$_2$ layer that is formed of a Zn phase, an Al phase, and a MgZn$_2$ phase finally solidified in the outside of the Al primary phase due to a Zn—Al—Mg-based eutectic reaction. The Zn/Al/MgZn$_2$ ternary eutectic structure also has the chemical convertibility improvement effect, but the improvement effect thereof is lower than that of the Fe—Al phase or the rod-like Zn/MgZn$_2$ lamellar structure. Therefore, the area fraction of the Zn/Al/MgZn$_2$ ternary eutectic structure is preferably as low as possible. Therefore, in the plating layer according to the embodiment, the area fraction of the Zn/Al/MgZn$_2$ ternary eutectic structure is preferably 5% or less and more preferably 3% or less.

Massive Zn Phase: 10% or Less

The massive Zn phase is a structure that may be formed when the Mg content in the plating layer is low. When the massive Zn phase is formed, the blister width tends to increase. The area ratio is preferably as low as possible and is preferably 10% or less. The massive Zn phase is a phase different from the Zn phase in the Zn/MgZn$_2$ binary eutectic structure. The massive Zn phase has a dendritic shape and may also be observed to be circular on the cross sectional structure.

Other Intermetallic Compound Phase: 10% or Less

Other intermetallic compound phases do not preferably affect chemical convertibility. Therefore, the area fraction of the other intermetallic compound phases is preferably 10% or less and more preferably 5% or less. Examples of the other intermetallic compound phase include a Mg$_2$SiCaZn$_{11}$ phase, an Al$_2$CaSi$_2$ phase, and an Al$_2$CaZn$_2$ phase.

Unless specified otherwise, "area fraction" in the embodiment refers to an arithmetic mean value when an area ratio of a desired structure in a plating layer surface is calculated for arbitrarily selected five different samples. This area fraction represents the volume fraction in the plating layer in practice.

<Method of Measuring Area Fraction>

The area fraction of each of the structures in the plating layer is obtained using the following method.

First, a plated steel sheet as a target to be measured is cut into 25 (c)×25 (L) mm, a surface SEM image of the plating layer and an element distribution image by EDS are obtained. Regarding the area fractions of the constituent structures of the plating layer, that is, the Fe—Al phase, the rod-like lamellar structure of Zn and MgZn$_2$, the massive MgZn$_2$ phase, the Al—Zn dendrite, the Zn/Al/MgZn$_2$ ternary eutectic structure, the massive Zn phase, the plate-like Zn/MgZn$_2$ lamellar structure, the Mg$_2$Si phase, and the other intermetallic compound phase, one visual field is imaged from each of five samples having different surface EDS mapping images of the plating layers, that is, five visual fields (magnification: 1500-fold) in total are imaged, and the area fraction of each of the structures is measured by image analysis. For example, in the EDS mapping image, regions containing Fe, Zn, Al, Mg, and Si can be displayed by different colors. Therefore, in this mapping image, a phase formed of Al and Fe is determined to be the Fe—Al phase. In addition, in the mapping image, the structure formed of the rod-like MgZn$_2$ phase and the Zn phase surrounding the rod-like MgZn$_2$ phase is determined to be the rod-like Zn/MgZn$_2$ lamellar structure. The other phases can be determined using the same method. The area of the visual field may be, for example, 45 μm×60 μm. The area fraction of each of the structures is obtained, for example, as an arithmetic mean value of area fractions of each of the structures measured in the respective visual fields (=(Area of Each of Structures in Any Visual field)/(Area of This Visual field)×100). In Examples described below, the area fraction of each of the structures was measured using this method.

<Characteristics>

The plated steel sheet according to the embodiment has excellent chemical convertibility by including the steel and the plating layer having the above-described characteristics.

In addition, the plated steel sheet according to the embodiment has excellent LME resistance by including the steel and the plating layer having the above-described characteristics. A chemical conversion film that is applicable to the plated steel sheet according to the embodiment is not particularly limited. For example, the chemical conversion film may be a zinc phosphate film mainly formed of a hopeite as zinc phosphate crystal.

[Method of Manufacturing Plated Steel Sheet]

Next, a method of manufacturing the plated steel sheet according to the embodiment will be described.

A method of manufacturing the plated steel sheet according to the embodiment includes: a hot-dip plating process of dipping a base steel sheet in a plating bath containing at least Al, Mg, Ca, and Zn to perform hot-dip plating; an alloying process of heating the hot-dip plated base steel sheet at 440° C. to 480° C. for 2 to 8 seconds; and a cooling process of cooling the plated steel sheet to 335° C. at an average cooling rate of 20° C./sec or faster.

<Hot-Dip Plating Process>

In the hot-dip plating process, a base steel sheet is dipped in a plating bath containing at least Al, Mg, Ca, and Zn to perform hot-dip plating.

In the hot-dip plating process, a so-called hot-dip plating method of adhering the plating bath to the base steel sheet surface and pulling the base steel sheet from the plating bath to solidify the molten metal adhered to the base steel sheet surface is used.

(Plating Bath)

The composition of the plating bath is not particularly limited as long as it contains at least Al, Mg, Ca, and Zn, and raw materials are prepared and dissolved in the plating bath to achieve the composition of the above-described plating layer.

The temperature of the plating bath is preferably in a range of higher than 380° C. and 600° C. or lower and may be in a range of 400° C. to 600° C.

It is preferable that the base steel sheet surface is reduced by heating the base steel sheet in a reducing atmosphere before being dipped in the plating bath. For example, a heat treatment is performed in a mixed atmosphere of nitrogen and hydrogen at 600° C. or higher, desirably 750° C. or higher for 30 seconds or longer. After completion of the reduction treatment, the base steel sheet is dipped in the plating bath after being cooled to the temperature of the plating bath. The dipping time may be, for example, 1 second or longer. When the base steel sheet dipped in the plating bath is pulled, the plating adhesion amount is adjusted by gas wiping. The adhesion amount to the single surface of the base steel sheet is preferably in a range of 10 g/m$^2$ to 300 g/m$^2$ and may be in a range of 20 g/m$^2$ to 250 g/m$^2$.

<Alloying Process>

A method of manufacturing the plated steel sheet according to the embodiment includes the alloying process of heating the hot-dip plated base steel sheet in a temperature range of 440° C. to 480° C. for 2 to 8 seconds after the hot-dip plating process. Through the alloying process, the plating layer having the desired structures (that is, the structures having the above-described area fractions) is formed, and excellent chemical convertibility can be obtained.

In the alloying process, when the heating temperature (hereinafter, referred to as "alloying temperature") is lower than 440° C., the alloying process is slow, which is not preferable. Therefore, the alloying temperature is 440° C. or higher.

On the other hand, when the alloying temperature is higher than 480° C., alloying progresses excessively within a short period of time, and the alloying process cannot be suitably controlled, which is not preferable. For example, in the alloying process, Fe dispersed in the plating layer reacts with Al prior to Zn such that the Fe—Al phase is formed. However, when alloying progresses excessively, redundant Fe that does not react with Al reacts with Zn in the plating layer such that a large amount of the Fe—Zn phase is formed. Therefore, the alloying temperature is 480° C. or lower.

In a case where the heating time (hereinafter, referred to as "alloying time") in the alloying process is shorter than 2 seconds, when the hot dip-plated base steel sheet is heated in a temperature range of 440° C. to 480° C., the progress of alloying is insufficient, which is not preferable. Therefore, the alloying time is 2 seconds or longer.

On the other hand, when the alloying time is longer than 8 seconds, alloying progresses significantly, which is not preferable. For example, a large amount of the Fe—Zn phase is formed as in the case where the alloying temperature is excessively high. Therefore, the alloying time is 8 seconds or shorter.

In the alloying process, a heating method is not particularly limited. For example, a heating method such as induction heating can be used.

<Cooling Process>

A method of manufacturing the plated steel sheet according to the embodiment includes: a cooling process of cooling the plated steel sheet in a temperature range (hereinafter, referred to as "cooling temperature range") from the alloying temperature to 335° C. at an average cooling rate of 20° C./sec or faster after the alloying process.

When the plated steel sheet is cooled in the cooling temperature range at an average cooling rate of slower than 20° C./sec, a suitable structure (in particular, the rod-like $Zn/MgZn_2$ lamellar structure) is not formed in the plating layer, which is not preferable. Therefore, the average cooling rate in the cooling temperature range is 20° C./sec or faster and preferably 25° C./sec or faster.

Through the above-described processes, the plated steel sheet according to the embodiment can be manufactured.

The plated steel sheet according to the embodiment has excellent chemical convertibility. In addition, the plated steel sheet according to the embodiment has excellent LME resistance.

EXAMPLES

Example 1

<Base Steel Sheet>

As a plated base steel sheet, a cold-rolled steel sheet (0.2% C-1.5% Si-2.6% Mn) having a sheet thickness of 1.6 mm was used.

<Plating Bath>

Plating baths having different chemical compositions depending on Test No. (level) were prepared such that a plating layer having a chemical composition shown in Table 1 was formed on the base steel sheet. The chemical composition of the plating layer was measured using the above-described method.

TABLE 1

| | | Plating Layer Component (mass %) | | | | | | Impurities | |
|---|---|---|---|---|---|---|---|---|---|
| Classification | No. | Zn | Al | Mg | Fe | Ca | Si | Kind of Element | Total % |
| Comparative Example | 1 | 96.77 | 0.10 | 3.00 | 0.10 | 0.03 | 0.00 | — | 0 |
| Comparative Example | 2 | 87.60 | 5.00 | 2.00 | 5.00 | 0.20 | 0.20 | — | 0 |
| Example | 3 | 86.97 | 5.00 | 3.00 | 5.00 | 0.03 | 0.00 | — | 0 |
| Example | 4 | 84.45 | 5.10 | 5.10 | 5.10 | 0.10 | 0.00 | Cu: 0.1, Sr0.05 | 0.15 |
| Example | 5 | 73.00 | 9.90 | 7.10 | 9.90 | 0.10 | 0.00 | — | 0 |
| Example | 6 | 68.92 | 10.00 | 10.00 | 10.00 | 1.00 | 0.00 | Sb: 0.08 | 0.08 |
| Comparative Example | 7 | 72.90 | 10.10 | 6.80 | 10.10 | 0.10 | 0.00 | — | 0 |
| Comparative Example | 8 | 72.70 | 10.20 | 6.90 | 10.20 | 0.00 | 0.00 | — | 0 |
| Example | 9 | 74.74 | 11.00 | 3.00 | 11.00 | 0.03 | 0.20 | Ti: 0.03 | 0.03 |
| Example | 10 | 71.40 | 11.60 | 5.20 | 11.60 | 0.10 | 0.10 | — | 0 |
| Example | 11 | 62.80 | 15.50 | 6.10 | 15.50 | 0.10 | 0.00 | — | 0 |
| Example | 12 | 61.30 | 16.00 | 6.20 | 16.00 | 0.20 | 0.00 | Ni: 0.2, Mn0.1 | 0.3 |
| Comparative Example | 13 | 59.40 | 17.20 | 6.20 | 17.10 | 0.10 | 0.00 | — | 0 |
| Comparative Example | 14 | 57.40 | 18.20 | 6.10 | 18.20 | 0.10 | 0.00 | — | 0 |
| Comparative Example | 15 | 59.40 | 17.20 | 6.30 | 17.00 | 0.10 | 0.00 | — | 0 |
| Comparative Example | 16 | 59.50 | 17.00 | 6.40 | 17.00 | 0.10 | 0.00 | — | 0 |
| Example | 17 | 62.29 | 17.30 | 3.00 | 17.20 | 0.20 | 0.00 | Pb: 0.01 | 0.01 |
| Example | 18 | 61.10 | 17.20 | 4.20 | 17.10 | 0.30 | 0.10 | — | 0 |
| Example | 19 | 58.96 | 17.30 | 6.51 | 17.20 | 0.03 | 0.00 | — | 0 |
| Example | 20 | 55.78 | 17.50 | 6.52 | 20.00 | 0.10 | 0.10 | — | 0 |
| Example | 21 | 45.79 | 20.50 | 13.00 | 20.50 | 0.10 | 0.10 | Sn: 0.01 | 0.01 |
| Example | 22 | 46.20 | 22.90 | 7.90 | 22.90 | 0.10 | 0.00 | — | 0 |
| Example | 23 | 45.20 | 23.10 | 8.00 | 23.30 | 0.20 | 0.20 | — | 0 |
| Comparative Example | 24 | 45.00 | 22.50 | 7.80 | 22.50 | 2.20 | 0.00 | — | 0 |
| Comparative Example | 25 | 45.90 | 22.90 | 8.10 | 23.00 | 0.00 | 0.10 | — | 0 |
| Comparative Example | 26 | 44.60 | 22.40 | 8.00 | 22.50 | 0.20 | 2.30 | — | 0 |
| Comparative Example | 27 | 34.90 | 25.80 | 14.00 | 25.10 | 0.20 | 0.00 | — | 0 |
| Example | 30 | 40.60 | 25.60 | 8.00 | 25.60 | 0.10 | 0.10 | — | 0 |
| Example | 31 | 45.80 | 25.70 | 3.00 | 25.30 | 0.10 | 0.10 | — | 0 |
| Example | 32 | 36.40 | 28.30 | 7.00 | 28.10 | 0.10 | 0.10 | — | 0 |
| Example | 33 | 29.80 | 30.10 | 10.00 | 29.90 | 0.10 | 0.10 | — | 0 |

TABLE 1-continued

| Classification | No. | | | | | | | |
|---|---|---|---|---|---|---|---|---|
| Example | 34 | 17.90 | 35.00 | 10.00 | 35.00 | 0.10 | 2.00 | — | 0 |
| Comparative Example | 35 | 20.80 | 36.00 | 7.00 | 36.00 | 0.20 | 0.00 | — | 0 |
| Comparative Example | 36 | 43.2 | 8.00 | 4.00 | 33.00 | 0.10 | 0.00 | — | 0 |

| Classification | No. | Plating Adhesion Amount of Single Surface of Plating Layer (g/m$^2$) | Bath temperature (° C.) | Manufacturing Conditions | | |
|---|---|---|---|---|---|---|
| | | | | Alloying Temperature (° C.) | Alloying Time (sec) | Cooling Rate to 335° C. after Alloying (° C./sec) |
| Comparative Example | 1 | 20 | 440 | 480 | 6 | 25 |
| Comparative Example | 2 | 40 | 455 | 480 | 6 | 25 |
| Example | 3 | 40 | 430 | 480 | 8 | 25 |
| Example | 4 | 40 | 450 | 480 | 8 | 25 |
| Example | 5 | 40 | 470 | 480 | 8 | 25 |
| Example | 6 | 41 | 500 | 480 | 8 | 25 |
| Comparative Example | 7 | 42 | 460 | 480 | 20 | 25 |
| Comparative Example | 8 | 39 | 460 | 480 | 8 | 25 |
| Example | 9 | 150 | 460 | 480 | 8 | 25 |
| Example | 10 | 250 | 460 | 480 | 8 | 25 |
| Example | 11 | 40 | 480 | 480 | 8 | 25 |
| Example | 12 | 10 | 480 | 480 | 8 | 25 |
| Comparative Example | 13 | 25 | 480 | 300 | 6 | 25 |
| Comparative Example | 14 | 41 | 480 | — | — | 25 |
| Comparative Example | 15 | 42 | 480 | 580 | 8 | 25 |
| Comparative Example | 16 | 43 | 480 | 480 | 8 | 5 |
| Example | 17 | 41 | 500 | 480 | 6 | 25 |
| Example | 18 | 40 | 500 | 480 | 6 | 25 |
| Example | 19 | 40 | 500 | 480 | 6 | 25 |
| Example | 20 | 42 | 500 | 480 | 6 | 25 |
| Example | 21 | 43 | 560 | 480 | 6 | 25 |
| Example | 22 | 41 | 510 | 480 | 6 | 25 |
| Example | 23 | 25 | 510 | 480 | 6 | 25 |
| Comparative Example | 24 | 42 | 510 | 480 | 6 | 25 |
| Comparative Example | 25 | 53 | 510 | 480 | 6 | 25 |
| Comparative Example | 26 | 42 | 510 | 480 | 6 | 25 |
| Comparative Example | 27 | 43 | 510 | 480 | 6 | 25 |
| Example | 30 | 44 | 510 | 480 | 6 | 25 |
| Example | 31 | 28 | 550 | 480 | 6 | 25 |
| Example | 32 | 29 | 510 | 480 | 6 | 25 |
| Example | 33 | 50 | 530 | 480 | 6 | 25 |
| Example | 34 | 41 | 540 | 480 | 6 | 25 |
| Comparative Example | 35 | 25 | 580 | 480 | 8 | 25 |
| Comparative Example | 36 | 42 | 500 | 660 | 13 | 10 |

<Hot-Dip Plating Process>

The base steel sheet was cut into 100 mm×200 mm and subsequently was plated using a batch type hot-dip plating test apparatus. The sheet temperature was measured using a thermocouple spot-welded to a central part of the base steel sheet.

Before dipping in the plating bath, in a furnace having an oxygen concentration of 20 ppm or lower, the base steel sheet surface was heated and reduced at 860° C. in an atmosphere of $N_2$-5% $H_2$ gas and a dew point of 0° C. Next, the base steel sheet was air-cooled with $N_2$ gas such that the dipped sheet temperature reached the bath temperature+20° C., and was dipped in the plating bath having a bath temperature shown in Table 1 for about 3 seconds.

After dipping in the plating bath, the base steel sheet was pulled at a pulling rate of 100 mm/sec to 500 mm/sec. During pulling, the plating adhesion amount was controlled by $N_2$ wiping gas.

<Alloying Process>

After controlling the plating adhesion amount with the wiping gas, the alloying process was performed on the plated steel sheet under conditions of an alloying temperature and an alloying time shown in Table 1. In the alloying process, an induction heating device was used.

<Cooling Process>

The plated steel sheet was cooled from the alloying temperature to 335° C. by being cooled in the cooling temperature range under conditions shown in Table 1.

<Structure Observation>

In order to investigate the structure configuration of the plating layer, the prepared sample was cut into 25 (c)×25 (L) mm, and a surface SEM image of the plating layer and an element distribution image by EDS were obtained. Regarding the area fractions of the constituent structures in the plating layer, that is, the Fe—Al phase, the rod-like lamellar structure of Zn and $MgZn_2$, the massive $MgZn_2$ phase, the Al—Zn dendrite, the Zn/Al/$MgZn_2$ ternary eutectic structure, the massive Zn phase, the plate-like Zn/$MgZn_2$ lamellar structure, the Fe—Zn phase, the $Mg_2Si$ phase, and the other intermetallic compound phase, one visual field was imaged from each of five samples having different surface EDS mapping images of the plating layers, that is, five visual fields (magnification: 1500-fold) in total were imaged, and the area fraction of each of the structures was measured by image analysis. The area of each of the visual fields was 45 μm×60 μm. A specific measurement method is as described above.

The area fraction of each of the structures in each of Examples and Comparative Examples is shown in Table 2.

<Chemical Convertibility>

In each of Examples and Comparative Examples, the chemical convertibility was evaluated using the following method.

The plated steel sheet according to each of Examples and Comparative Examples manufactured using the above-described method was cut into a size of 50 mm×100 mm, and a zinc phosphating process (SD5350 system, manufactured by Nippon Paint Surf Chemicals Co., Ltd.) was performed thereon.

Regarding the plated steel sheet on which the zinc phosphating process was performed, the coverage of the chemical conversion crystal was evaluated by SEM observation. A case where coverage of the chemical conversion crystal was 100% with respect to the area of the surface was evaluated as "AAA", a case where coverage of the chemical conversion crystal was 98% or more with respect to the area of the surface was evaluated as "AA", a case where coverage of the chemical conversion crystal was 95% or more with respect to the area of the surface was evaluated as "A", a case where coverage of the chemical conversion crystal was less than 95% and 90% or more with respect to the area of the surface was evaluated as "B", a case where coverage of the chemical conversion crystal was less than 90% and 85% or more with respect to the area of the surface was evaluated as "C", and a case where coverage of the chemical conversion crystal was less than 85% with respect to the area of the surface was evaluated as "D". "A" or higher was an acceptable level.

TABLE 2

| | | Surface Structure Configuration | | | | | |
|---|---|---|---|---|---|---|---|
| Classification | No. | Rod-like Zn/MgZn$_2$ Lamellar Structure Area Fraction (area %) | Massive MgZn$_2$ Phase Area Fraction (area %) | Fe—Al Phase Area Fraction (area %) | (A) Plate-Like Zn/MgZn$_2$ Lamellar Structure Area Fraction (area %) | (B) Massive Zn Phase Area Fraction (area %) | (C) (Al—Zn) Dendrite Area Fraction (area %) |
| Comparative Example | 1 | Excessive Dross Adhesion | | | | | |
| Comparative Example | 2 | 67 | 8 | 9 | 0 | 16 | 0 |
| Example | 3 | 82 | 10 | 0 | 0 | 8 | 0 |
| Example | 4 | 63 | 31 | 4 | 0 | 0 | 2 |
| Example | 5 | 46 | 49 | 5 | 0 | 0 | 0 |
| Example | 6 | 29 | 65 | 6 | 0 | 0 | 0 |
| Comparative Example | 7 | 15 | 54 | 31 | 0 | 0 | 0 |
| Comparative Example | 8 | 0 | 57 | 5 | 38 | 0 | 0 |
| Example | 9 | 65 | 25 | 7 | 0 | 3 | 0 |
| Example | 10 | 49 | 51 | 0 | 0 | 0 | 0 |
| Example | 11 | 39 | 56 | 5 | 0 | 0 | 0 |
| Example | 12 | 38 | 52 | 8 | 0 | 0 | 0 |
| Comparative Example | 13 | 0 | 51 | 0 | 0 | 0 | 36 |
| Comparative Example | 14 | 0 | 49 | 0 | 0 | 0 | 37 |
| Comparative Example | 15 | 12 | 51 | 37 | 0 | 0 | 0 |
| Comparative Example | 16 | 0 | 53 | 7 | 21 | 0 | 0 |
| Example | 17 | 70 | 21 | 7 | 0 | 0 | 0 |
| Example | 18 | 46 | 45 | 8 | 0 | 0 | 0 |
| Example | 19 | 36 | 55 | 9 | 0 | 0 | 0 |
| Example | 20 | 31 | 59 | 10 | 0 | 0 | 0 |
| Example | 21 | 9 | 70 | 21 | 0 | 0 | 0 |
| Example | 22 | 25 | 59 | 16 | 0 | 0 | 0 |
| Example | 23 | 21 | 61 | 18 | 0 | 0 | 0 |
| Comparative Example | 24 | 19 | 64 | 5 | 0 | 0 | 0 |
| Comparative Example | 25 | 2 | 55 | 5 | 38 | 0 | 0 |
| Comparative Example | 26 | 0 | 51 | 0 | 0 | 0 | 21 |
| Comparative Example | 27 | 4 | 82 | 14 | 0 | 0 | 0 |
| Example | 30 | 14 | 66 | 20 | 0 | 0 | 0 |
| Example | 31 | 48 | 31 | 21 | 0 | 0 | 0 |
| Example | 32 | 9 | 66 | 25 | 0 | 0 | 0 |
| Example | 33 | 6 | 66 | 28 | 0 | 0 | 0 |
| Example | 34 | 5 | 57 | 30 | 0 | 0 | 0 |
| Comparative Example | 35 | 5 | 60 | 35 | 0 | 0 | 0 |
| Comparative Example | 36 | 0 | 36 | 29 | 0 | 0 | 0 |

| | | Surface Structure Configuration | | | | |
|---|---|---|---|---|---|---|
| Classification | No. | (D) Zn/Al/MgZn$_2$ Ternary Eutectic Structure Area Fraction (area %) | (E) Mg$_2$Si Phase Area Fraction (area %) | (F) Other Intermetallic Compound Phase (area %) | Sum of (A) to (F) (area %) | Evaluation Chemical Convertibility |
| Comparative Example | 1 | Excessive Dross Adhesion | | | | C |
| Comparative Example | 2 | 0 | 0 | 0 | 16 | B |
| Example | 3 | 0 | 0 | 0 | 8 | A |
| Example | 4 | 0 | 0 | 0 | 2 | AAA |
| Example | 5 | 0 | 0 | 0 | 0 | AAA |
| Example | 6 | 0 | 0 | 0 | 0 | AA |
| Comparative Example | 7 | 0 | 0 | 0 | 0 | C |
| Comparative Example | 8 | 0 | 0 | 0 | 38 | B |
| Example | 9 | 0 | 0 | 0 | 3 | A |
| Example | 10 | 0 | 0 | 0 | 0 | AAA |
| Example | 11 | 0 | 0 | 0 | 0 | AAA |
| Example | 12 | 0 | 2 | 0 | 2 | AAA |

TABLE 2-continued

| | | | | | | | |
|---|---|---|---|---|---|---|---|
| Comparative Example | 13 | 13 | 0 | 0 | <u>49</u> | C |
| Comparative Example | 14 | 14 | 0 | 0 | <u>51</u> | C |
| Comparative Example | 15 | 0 | 0 | 0 | 0 | C |
| Comparative Example | 16 | 19 | 0 | 0 | <u>40</u> | B |
| Example | 17 | 2 | 0 | 0 | 2 | AAA |
| Example | 18 | 0 | 1 | 0 | 1 | AAA |
| Example | 19 | 0 | 0 | 0 | 0 | AAA |
| Example | 20 | 0 | 0 | 0 | 0 | AAA |
| Example | 21 | 0 | 0 | 0 | 0 | A |
| Example | 22 | 0 | 0 | 0 | 0 | AA |
| Example | 23 | 0 | 0 | 0 | 0 | AA |
| Comparative Example | 24 | 0 | 0 | 12 | <u>12</u> | B |
| Comparative Example | 25 | 0 | 0 | 0 | <u>38</u> | B |
| Comparative Example | 26 | 16 | 12 | 0 | <u>49</u> | C |
| Comparative Example | 27 | 0 | 0 | 0 | 0 | B |
| Example | 30 | 0 | 0 | 0 | 0 | A |
| Example | 31 | 0 | 0 | 0 | 0 | A |
| Example | 32 | 0 | 0 | 0 | 0 | A |
| Example | 33 | 0 | 0 | 0 | 0 | A |
| Example | 34 | 0 | 8 | 0 | 8 | A |
| Comparative Example | 35 | 0 | 0 | 0 | 0 | C |
| Comparative Example | 36 | 0 | 0 | <u>35</u> | <u>35</u> | C |

It was found that, in each of Examples prepared with the predetermined plating bath composition under the appropriate alloying process conditions and cooling conditions, the predetermined structures were able to be obtained such that suitable chemical convertibility was obtained.

On the other hand, at a level (Comparative Example 1) where Al and Fe were insufficient, dross was excessively attached to the plated steel sheet, and chemical convertibility deteriorated significantly. At a level (Comparative Example 2) where the amount of Mg was insufficient, a sufficient amount of the massive $MgZn_2$ phase was not able to be formed, the structure of the remainder deteriorating chemical convertibility was excessively formed (the sum of the area fractions ((A) to (F)) exceed 10.0%), and the performance was poor.

At a level (Comparative Example 7) where the alloying time was excessively long, the structure of the Fe—Al phase was excessively formed, and the performance was poor. At a level (Comparative Examples 8 and 25) where Ca was not added, the $Zn/MgZn_2$ rod-like lamellar structure was not able to be formed, or only a small amount thereof was able to be formed. The structure of the remainder was excessively formed, and the performance was poor.

At a level where the alloying temperature was excessively low (Comparative Example 13) and at a level (Comparative Example 14) where the alloying process was not performed and the $Zn/MgZn_2$ rod-like lamellar structure was not to be formed, the structure of the remainder was excessively formed, and the performance was poor. At a level (Comparative Example 15) where the alloying temperature was excessively high, the structure of the Fe—Al phase was excessively formed, and the performance was poor. At a level (comparative Example 36) where the alloying temperature was excessively high, the alloying time was excessively long, and the cooling rate was slow, the rod-like $Zn/MgZn_2$ lamellar structure was not formed, the Fe—Zn phase was excessively formed (the Fe—Zn phase was counted as the other intermetallic compound phase), and the performance was poor. At a level (Comparative Example 16) where the cooling rate was slow, the rod-like $Zn/MgZn_2$ lamellar structure was not formed, the structure of the remainder was excessively formed, and the performance was poor.

At a level (Comparative Example 24) where an excess amount of Ca was contained, the structure of the remainder was excessively formed, and the performance was poor. At a level (Comparative Example 26) where Si is excessively contained, alloying is inhibited, the rod-like $Zn/MgZn_2$ lamellar structure was not formed, the structure of the remainder was excessively formed, and the performance was poor.

At a level (Comparative Example 27) where an excess amount of Mg was contained, the rod-like $Zn/MgZn_2$ lamellar structure was not formed sufficiently, the massive $MgZn_2$ phase was excessively formed, and the performance was poor. At a level (Comparative Example 35) where Al and Fe were excessively contained, the Fe—Al phase was excessively formed, and the performance was poor.

Example 2

In Example 2, LME resistance was investigated for Examples which were used in Example 1. That is, the components, the structures, and the manufacturing conditions of the plated steel sheets used in Example 2 are shown in Table 1.

<LME Resistance>

Some of the plated steel sheets according to Examples used in Example 1 were cut into a size of 200 mm×20 mm and were provided for a hot V-bending test to perform hot V-bending at 800° C. By observing a cross section of the processed portion after V-bending, whether or not LME cracking occurred was determined to evaluate LME resistance. A case where LME cracking did not occur in a V-bending mold having an angle of 90° even when R was 6 mm was represented by "AAA", a case where LME cracking did not occur in a V-bending mold having an angle of 90° even when R was 8 mm was represented by "AA", and a case where LME cracking did not occur in a V-bending mold having an angle of 90° even when R was 16 mm was represented by "A". "A" or higher was an acceptable level.

The evaluation results of LME resistance of Examples are shown in Table 3. The area fraction of each of the structures is shown in Table 2 and thus is not shown in Table 3.

TABLE 3

| Classification | No. | Evaluation LME Resistance |
|---|---|---|
| Example | 3 | AA |
| Example | 4 | AA |
| Example | 5 | AA |
| Example | 6 | AA |
| Example | 9 | AA |
| Example | 10 | AA |
| Example | 11 | AA |
| Example | 12 | AA |
| Example | 17 | AA |
| Example | 18 | AA |
| Example | 19 | AA |
| Example | 20 | AA |
| Example | 21 | AAA |
| Example | 22 | A |
| Example | 23 | AA |
| Example | 30 | AAA |
| Example | 31 | AAA |
| Example | 32 | AAA |
| Example | 33 | AAA |
| Example | 34 | AAA |

As shown in Table 3, in each of Examples, LME resistance was suitable. In particular, in Examples where 30% or more of the rod-like Zn/MgZn$_2$ lamellar structure was present, LME resistance tended to be "AA". In addition, in Examples where 20% or more of the Fe—Al phase was present, LME resistance was "AAA". When LME resistance was evaluated for Comparative Examples, LME resistance was evaluated as B or lower in all Comparative Examples.

BRIEF DESCRIPTION OF THE REFERENCE SYMBOLS

10: plated steel sheet according to embodiment
11: rod-like lamellar structure of Zn and MgZn$_2$
12: massive MgZn$_2$ phase
13: Fe—Al phase
14: Al—Zn dendrite
15: massive Zn
16: Fe—Al phase
17: Mg$_2$Si phase
18: massive MgZn$_2$ phase (that is not hexagonal).

What is claimed is:

1. A plated steel sheet comprising:
a steel; and
a plating layer that is provided on a surface of the steel, wherein a composition of the plating layer includes, by mass %:
Al: 5.00% to 35.00%,
Mg: 2.50% to 13.00%,
Fe: 5.00% to 35.00%,
Si: 0% to 2.00%, and
Ca: 0.03% to 2.00%,
a remainder of the composition of the plating layer comprising Zn and impurities; and
in a surface of the plating layer, an area fraction of a Fe—Al phase is 0% to 30%, an area fraction of a rod-like lamellar structure of Zn and MgZn$_2$ is 5% to 90%, an area fraction of a MgZn$_2$ phase having a hexagonal shape is 10% to 70%, and an area fraction of a remainder is 10% or less.

2. The plated steel sheet according to claim 1, wherein the plating layer includes, by mass %, Al: 10.00% to 30.00%.

3. The plated steel sheet according to claim 1, wherein the plating layer includes, by mass %, Mg: 3.00% to 10.00%.

4. The plated steel sheet according to claim 1, wherein the plating layer includes, by mass %, Mg: 4.00% or more and 13.00% or less.

5. The plated steel sheet according to claim 1, wherein the plating layer includes, by mass %, Ca: 0.03% to 1.00%.

6. The plated steel sheet according to claim 1, wherein in the surface of the plating layer, an area fraction of the lamellar structure is 10% b 60%.

7. The plated steel sheet according to claim 1, wherein, in the surface of the plating layer, the remainder includes an Al—Zn dendrite mainly formed of an Al phase and a Zn phase, and an area fraction of the Al—Zn dendrite is 0% to 5%.

8. The plated steel sheet according to claim 1, wherein, in the surface of the plating layer, the remainder includes a Zn/Al/MgZn$_2$ ternary eutectic structure, and an area fraction of the Zn/Al/MgZn$_2$ ternary eutectic structure is 5% or less.

9. The plated steel sheet according to claim 1, wherein, in the surface of the plating layer, the remainder includes a Zn phase having a dendritic shape or being observed to be circular on the cross sectional structure, and an area fraction of said Zn phase having a dendritic shape or being observed to be circular on the cross sectional structure is 10% or less.

10. The plated steel sheet according to claim 1, wherein, in the surface of the plating layer, the remainder includes a plate-like Zn/MgZn$_2$ lamellar structure, and an area fraction of the plate-like Zn/MgZn$_2$ lamellar structure is 10% or less.

11. The plated steel sheet according to claim 1, wherein, in the surface of the plating layer, the remainder includes a Mg$_2$Si phase, and an area fraction of the Mg$_2$Si phase is 10% or less.

* * * * *